July 6, 1954 H. G. GREIG 2,683,111

ELECTRICAL RECORDING

Filed June 29, 1949

INVENTOR
Harold G. Greig
BY
[signature]
ATTORNEY

Patented July 6, 1954 2,683,111

UNITED STATES PATENT OFFICE 2,683,111

ELECTRICAL RECORDING

Harold G. Greig, Princeton, N. J., assignor to Radio Corporation of America, a corporation of Delaware Application June 29, 1949, Serial No. 102,133

The terminal fifteen years of the term of the patent to be granted has been disclaimed 2 Claims. (Cl. 204—2)

The present invention relates to the production of marks in the form of images and the like on or in a recording medium under control of electrical signals, and, more particularly, although not necessarily exclusively, to novel methods and means for producing a record in the form of an image under control of image signals or the like by the application of heat to a recording medium simultaneously with or following application of an electrical signal to the recording medium in sharply defined elemental areas thereof.

In accordance with the present invention in a preferred form thereof a sheet which is moistened with a solution of an electrolyte is treated by passage of an electric current in sharply defined local areas so that the surface of the sheet which has been in contact with the positive recording electrode during recording current flow will be more acidic in nature than the remainder of the sheet. The elemental areas of the sheet which are acidified upon passage of current will char more readily upon application of heat than the remainder of the sheet and the charring in these areas will be confined to one side of the sheet. Many organic compounds, among them cellulose, will char more readily and at a lower temperature when acidified than they will when neutral or slightly alkaline. The present invention employs this property of such of these materials as is suitable for use as a recording medium for obtaining permanent marks which combine to form images of good resolution. Accordingly, an important object of the present invention is to provide novel means for producing marks on a record sheet and either simultaneously or subsequently treating the sheet by the application of heat to obtain a permanent record of images or the like of original subject matter which is scanned to produce electrical signals representing the subject matter.

Another object of the present invention is to produce sharply defined contrasting marks on a conductive sheet having areas on one side thereof subjected to the operation of a marking instrumentality by treating the sheet with heat in an amount sufficient only to cause darkening in the ares subjected to operation of the marking instrumentality.

Other objects and advantages of the present invention will, of course, become apparent and immediately suggest themselves to those skilled in the art to which the invention is directed from a reading of the following specification in connection with the accompanying drawings in which.

Figure 1:
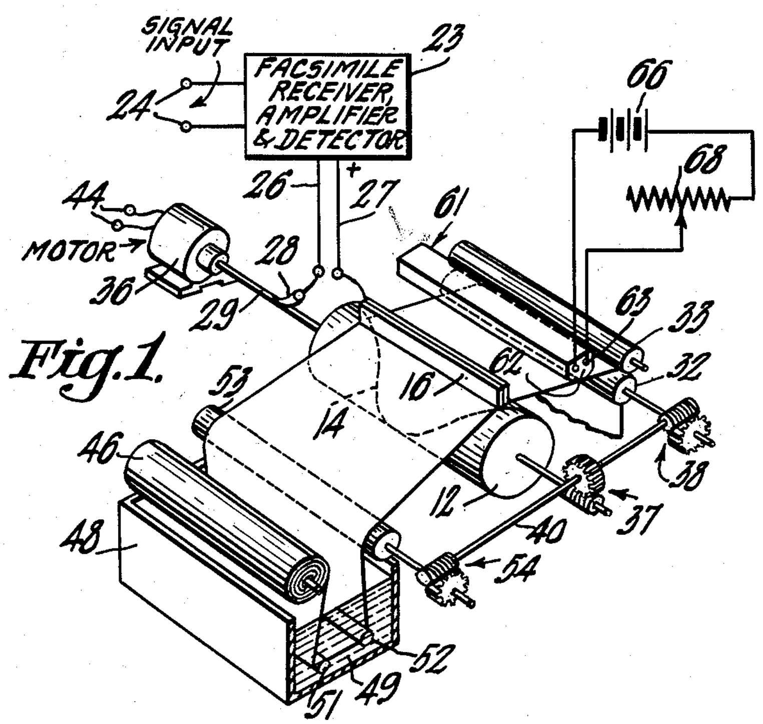
Fig. 1 is a diagrammatic showing of a system including apparatus embodying the invention.

Referring for the present to Fig. 1 of the drawing, there is shown, by way of example, a recorder which is suitable for passing an electric current through a recording medium in accordance with facsimile signals. This recorder is generally of the character described in U. S. Patent No. 2,215,806, granted to C. J. Young on September 24, 1940, and also in U. S. Patent 2,384,722, granted to A. Blain on September 11, 1940.

The recorder includes instrumentalities to provide for conveniently obtaining recordings in accordance with the present invention. It will be understood that these recordings may be obtained by means other than those illustrated. Also, the description of the illustrative embodiment to be given hereinafter refers to recording electrical signals by means of a helical recorder, so called, but it will be understood that the electrodes for the application of recording currents to the record sheet may take any desired form. For example, a stylus may be employed which traverses the sheet in a manner to produce complete scanning of the sheet as it is moved through the recording zone.

In the form shown, the recorder comprises a recording drum member 12, provided with a radially projecting helical electrode 14 mounted on its periphery which cooperates with a second electrode in the form of a printer bar member 16. This printer bar member is or may be carried by light pressure producing means, such, for example, as springs (not shown).

Reference character 23 designates a signal or facsimile receiver of any known type which is in communication with a signal input source 24. Signals suitable for recording are applied to the recording electrodes 14 and 16 from the receiver 23 over connections 26 and 27. One of the connections, for example the connection 26, may be in communication with a brush 28 which bears on the drum shaft 29, or the frame of the apparatus (not shown) as well as the terminal or connection 26 from the receiver 23 may be grounded to complete the connection to the recording electrodes. It will be understood that the helix 14 is conductively connected to the drum shaft 29. In accordance with the invention, the signals are applied with positive polarity from the receiver 23 to the electrode 16 which serves as the anode of the electrical recording couple 14—16. It will be understood, however, that the signals may be applied so that the helical electrode 14 serves as the anode which may conveniently be done by insulating the helix or the drum from other machine parts and applying the brush 28 to a slip ring section in electrical communication with the helical electrode.

The record receiving sheet 31, which serves as the recording medium, is threaded between the printer bar 16 and the helical electrode 14 and is, in the illustrative example, drawn through the recording zone by a pressure roller 32 which cooperates with a guide roller 33. One or both of these rollers may be driven by a motor 36 through a speed reducing mechanism such as worm and worm wheel combinations 37 and 38. The worm and worm wheel combination 37 drives a shaft 40 which serves as the mechanical connection for the web drive. The rotatable drum shaft 29 is or may be coupled to the rotor shaft of the motor 36, thereby driving the drum 12. The mechanical connections are indicated schematically and are shown only by way of example, as different forms may be used. The motor 36 may be of the synchronous type connected to an alternating current service connection 44. Where the motor 36 is connected to the same synchronized system as the motor (not shown) which drives the transmitting system, it will not, in general, be necessary to provide separate synchronizing signals. Synchronizing and phasing signals may be generated and transmitted as described in U. S. Patent 2,326,740, granted to Maurice Artzt on August 17, 1943 when desirable or necessary.

The record receiving sheet is or may be plain paper which is sufficiently absorbent to take up and retain a solution of an electrolyte. Paper is a form of cellulose which is an example of an organic compound which, as pointed out above, can be marked in accordance with the invention. Other organic compounds formed in a sheet or web, or which may be present in a sheet or web may be used.

Organic chemicals which char more readily under acid conditions than when neutral or alkaline, can be added to the paper or electrolyte solution to enhance the color formation. The introduction of metallic ions from the printer bar into the electrolyte solution in the paper also intensifies the charring effect.

The recording 31 is fed from a supply roll 46 and passes through a tank or tray 48 so as to be wetted by a liquid bath 49. The bath 49 is an aqueous solution of an electrolyte such as sodium chloride or potassium nitrate. Organic agents which aid in retention of sufficient moisture to insure conductivity may be added. For example, glycerin, polyhydric alcohols and polyethyleneglycols. As stated above, organic chemicals which char more readily under acid conditions than when neutral or alkaline may be added to the electrolyte. These may be added in solution or suspension. An electrolytic solution which is neutral is preferable since initial acidity of the recording medium prior to recording, will tend to produce an undesired darkening or discoloration of the web or sheet as a whole during application of heat. Examples of suitable electrolytes are sodium or potassium chloride and nitrate, magnesium sulphate, salts of strong organic acids such as sodium or potassium oxylates. The web 31 is guided through the liquid in the bath by suitable means such as idler rollers 51 and 52. Any excess of moisture over that required for carrying out the recording procedure of the invention may be scraped off in any suitable manner. As shown, a roller 53 driven by a worm and worm wheel combination 54 from the shaft 40 serves as a guide roller to deliver the web 31 between the recording electrodes. The bath 49 conditions the web 31 by rendering it electrically conductive so that an electric current will pass through it in the recording zone.

Further details of the helical recorder with respect to the paper feeding means and other conventional features are to be found in U. S. Reissue Patent Re. 20,152, granted to C. J. Young on October 27, 1936. The recorder in this last named patent, however, relies on a transfer of marking material to produce marking by vibrating the printer bar rather than an electrical or other process which depends upon a direct application of electrical effects to the record sheet. Other details of facsimile recorder employing an electrolytic process for producing marks are shown in U. S. Patent No. 2,391,765, granted to Maurice Artzt on December 25, 1945.

In accordance with the procedure of this invention, the paper web 31 which has been moistened in the bath 49 is subjected to the action of recording currents passing between the printer bar 16 and the helical electrode 14. The action of the recording current is such that the areas of the surface of the sheet or web 31, which have been in contact with the positive recording electrode, for example, the electrode 16, during current flow, will have become more acidic in nature than the rest of the sheet or web. Recording current of sufficient density to cause rupture of the cellulose fiber or of sizing material which may be employed in manufacture of the web causes dry and more absorbent areas to be formed where recording currents have passed through the web in sharply defined areas. With the application of sufficient heat following the recording operation, these areas will char first leaving the appearance of the rest of the web substantially unchanged. If white paper is employed for the web the paper will remain white except where recording currents have passed through it. Where acidity at the positive electrode is produced, the charring will occur. Where current of sufficient density is passed, as stated above, to cause rupture of the web charring will occur, which may be due in part to the rapid drying of the web at the time of maximum acidity.

This acidity at the positive electrode is only a transient condition due to an increase in the concentration of hydrogen ions during the current flow through the electrolyte solution in the paper. This greater tendency to char may also be due in part to the change in physical state of the ruptured paper surface or to the effect of oxidizing conditions at the surface in contact with the positive electrode.

Heat is preferably applied in controlled amounts to the surface of the sheet or web and charring will take place on the side contacted by the positive recording electrode. Heat can be applied to either surface of the paper, but it is preferably applied to the side acted upon by the positive electrode. The heating of the web is preferably carefully controlled so that charring will occur on only one side of the web and in sharply defined areas so as to promote resolution of the record.

In order that heat may be applied conveniently, a heating means in the form of an electrical heater 61 is shown which may comprise a resistance heating element (not shown) of any known type which is enclosed within a casing having a suitable portion 62 for transferring heat to the moving web 31. The terminals 63 of the heating element are connected to a suitable power source, the battery 66, for example, and the degree of generating heat is controlled by a rheostat or the like 68.

Several examples of procedures which were followed to obtain recordings, in accordance with the invention, will now be set forth:

One hundred per cent cotton rag bond paper containing melamine resin and rosin was used for the web 31. The recording current density was sufficiently high to form the relatively dry and more absorbent areas, mentioned in the foregoing. The color was developed after recording by applying heat in the manner disclosed above. The electrolyte solution used in the bath was sodium chloride dissolved in water with a ratio of 25 grams to a liter. A platinum positive electrode was used in the recorder.

Figure 2:
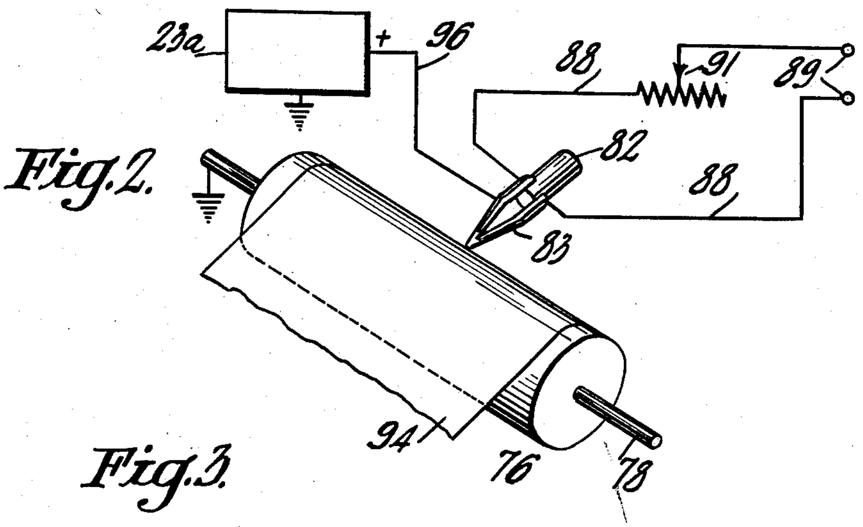
Fig. 2 is a diagrammatic showing of a modified recorder designed to operate in accordance with the present invention.
Figure 3:
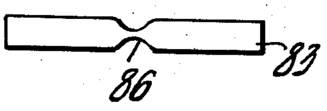
Fig. 3 is a developed view in plan of a portion of the modified recorder of Fig. 2.

Fig. 2 of the drawing shows an arrangement whereby heat may be applied simultaneously with the application of recording currents. In the arrangement of Fig. 2, a copyholder in the form of a drum 76 is provided which may be rotated by means of its shaft 78 by suitable means (not shown). A stylus holder 82 supports a stylus 83 which is constructed as shown more clearly in Fig. 3 of the drawings. The stylus 83 may be of platinum. The stylus 83 is made in U-shape and has a constricted section 86 to resist electric current flow so as to provide for local heating in the neighborhood of its point. Each leg of the U-shaped stylus is connected by leads 88 to a suitable power source indicated diagrammatically at 89. A regulator in the form of a rheostat 91 permits close regulation of the temperature of the stylus section 86 which is in contact with a record receiving sheet 94 carried by the drum 76. The sheet 94 is wrapped either partially or wholly around the drum 76 and is secured thereon in any suitable manner. As shown in the drawing, application of the sheet to the drum is not completed. The drum is grounded, as shown, and the stylus 83 is connected by a lead 96 to one terminal of a facsimile receiver and amplifier 23*a* or other source of marking current. It will be understood that means may be provided for transversing the stylus holder 82 as the drum 76 is rotated. This type of scanner is by now well known and is shown, for example, in Patent No. 2,289,486, granted to J. A. Cox on July 14, 1942. The stylus holder 82 could be supported and driven in the manner similar to the pick-up 3 shown in that patent.

The sheet 94 is previously moistened with an electrolyte such as one of the electrolytes named above. The recorder signals and the heating effect are supplied simultaneously.

What is claimed is:

1. The method of producing marks which combine to represent an image upon the surface of a record receiving sheet, comprising moistening said sheet with a neutral solution of an electrolyte which is a salt of a strong acid and a strong base, passing a unidirectional electric signaling current through said moistened sheet in successive elemental areas, said current being of a magnitude and being applied in a time sufficient to produce an acidified condition on one side of the sheet in each elemental area receiving said current, and immediately applying heat to one side of the sheet in an amount sufficient only to cause discoloration by charring of the area subjected to acidulation by the current to present an appearance which contrasts with the unchanged background of the sheet.

2. The method of producing marks which combine to represent an image upon the surface of a conductive record receiving sheet moistened with a neutral solution of an electrolyte selected from the group consisting of sodium chloride, potassium chloride, sodium nitrate, potassium nitrate and magnesium sulfate, comprising passing a unidirectional electric signaling current through said conductive sheet in successive elemental areas, said current passage being of a magnitude duration to acidify each elemental area receiving said current, and, while such area remains acidified prior to neutralization thereof, applying heat to one side of the sheet in an amount only to cause discoloration by charring of acidified elemental area to present an appearance which contrasts with the substantially unchanged background of the sheet.

References Cited in the file of this patent

UNITED STATES PATENTS

| Number | Name | Date |
|---|---|---|
| 859,948 | Kitsee | July 16, 1907 |
| 1,770,493 | Ranger | July 15, 1930 |
| 2,040,142 | Koreska et al. | May 12, 1936 |
| 2,227,109 | Shankweiler | Dec. 31, 1940 |
| 2,339,267 | Hogan et al. | Jan. 18, 1944 |
| 2,389,021 | Blain | Nov. 13, 1945 |
| 2,391,765 | Artzt | Dec. 25, 1945 |
| 2,453,484 | Young | Nov. 9, 1948 |
| 2,485,678 | Tribble | Oct. 25, 1949 |

FOREIGN PATENTS

| Number | Country | Date |
|---|---|---|
| 25,292 | Great Britain | of 1898 |
| 676,622 | France | Nov. 29, 1929 |